United States Patent Office 2,746,260
Patented May 22, 1956

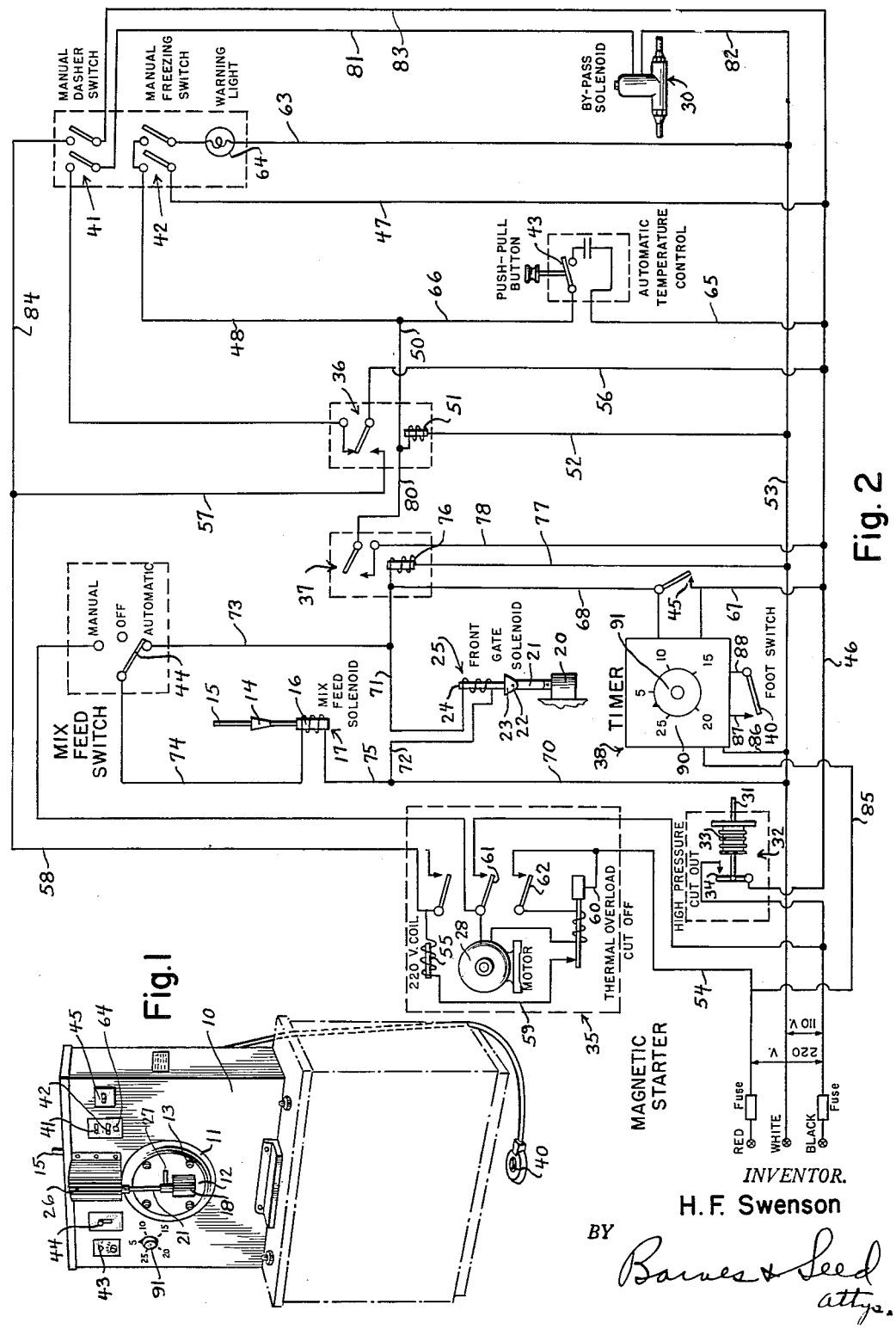

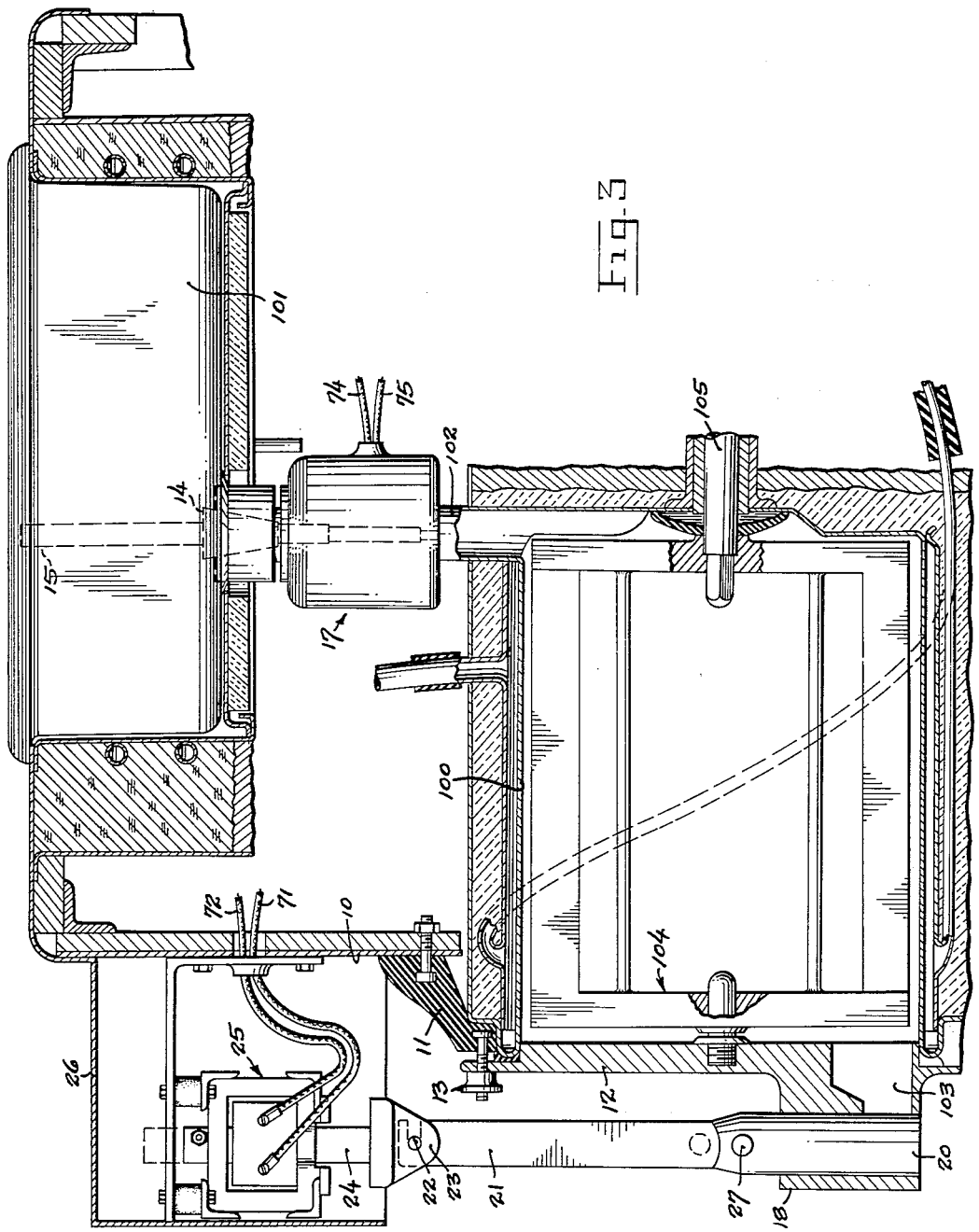

2,746,260
PORTION CONTROL FOR DISPENSING FREEZER

Harvey F. Swenson, Seattle, Wash.

Application July 14, 1952, Serial No. 298,788

5 Claims. (Cl. 62—4)

This invention relates to a portion control for a dispensing freezer of that general type illustrated and described in my pending applications, Ser. No. 105,377, filed July 18, 1949, now Patent No. 2,604,307, dated July 22, 1952 and Ser. No. 206,280, filed January 16, 1952, and namely a freezer which acts to freeze a custard or other like mix and dispense the same from its freezing cylinder through a serving gate in individual servings, and in which replenishing mix is charged to the freezing cylinder automatically as each of a succession of servings are dispensed.

In the use of machines of this nature it is usual for the operator to offer various priced servings to his customers, and basically this is normally built around five portions ranging from five to twenty-five cents. It will be appreciated that it is virtually impossible for the operator to dispense an exact uniformity of portions corresponding to each price. Furthermore, the fact that several operators in an establishment commonly dispense from the same machine makes portion uniformity impossible.

Accordingly, it is the principal object of the present invention to provide an arrangement whereby the quantity of each dispensed portion is accurately controlled automatically so that portion uniformity is obtained, and whereby several predetermined portion sizes can be dispensed in such manner from a single freezer.

The foregoing, together with other still more particular objects and advantages in view, will appear and be understood in the following description and claims, the invention consisting in the novel construction and in the adaptation and combination of parts hereinafter described and claimed.

In the accompanying drawings:

Figure 1 is a perspective view of a machine embodying the teachings of the present invention, indicated as being mounted upon a storage cabinet shown by dotted lines; and Fig. 2 is a diagrammatic view of electrical circuits employed in the machine; and Figure 3 is a sectional view illustrating the freezing cylinder with valve means for controlling the admission and withdrawal of mix.

The working mechanism of the present invention is desirably housed in a cabinet whose front wall 10 provides a circular opening circumscribed by a fixedly secured and forwardly projecting flared insulating collar 11. The removable front 12 for the unit's freezing cylinder 100 is held in position to the collar 11 by thumb screws 13. A supply tank 101 for the mix is mounted in the upper part of the cabinet and the flow of mix from this tank through a pipe 102 to the freezing cylinder is controlled by a conical stopper 14 the upper end 15 of which extends upwardly through the cover of the tank and the lower end of which depends into the pipe. A soft-iron slug 16 is adjustably mounted on this lower end and serves as the movable core of a mix feed solenoid 17.

The freezer front 12 presents a forwardly projecting nose 18 in which there is provided a vertical through-bore, and leading through a side-wall port into this bore is a feed passage 103 open to the interior of the freezing cylinder. A solid cylinder plunger valve 20, hereinafter termed a serving gate, is journaled for endwise sliding movement in said bore between a lower port-closing position and an upper dispensing position whereat the port is exposed. Pivotally attached to the upper end of this gate is a link 21 which hooks by its upper end over a pin 22 extending between the arms of a fork 23 made rigid with the core 24 of a serving gate solenoid 25. The serving gate is relatively heavy so as to move by gravity into its port-closing position and is raised into its dispensing position by an energizing of the solenoid. The latter is housed within a suitable cover 26 fixed to the front wall of the cabinet. The gate may also be operated by hand, and for this purpose there is provided an arm 27 projecting laterally from the upper exposed end of the gate.

A dasher 104 having the usual spirally developed blades is journaled within the freezing cylinder and is interconnected with a jack-shaft 105 projecting from the rear of the cylinder and driven through a reduction drive from a motor 28. This motor is also used to drive the refrigeration compressor and in order that the dasher can be driven independently of the compressor there is provided a by-pass line connecting the low-pressure to the high-pressure side of the compressor. Contained in this by-pass line is a normally closed valve operated by a by-pass solenoid 30. From the high-pressure side of the compressor the refrigerant feeds into a water-cooled condenser and thence through a coil in a heat-exchanger to an expansion valve from which it passes through a supply pipe to the freezing cylinder. The gaseous refrigerant then escapes into the heat-exchanger wherefrom it is carried into the low-pressure side of the compressor.

From the high-pressure side of the compressor a branch pipe 31 leads to a cut-out 32 and there acts upon a diaphragm 33, the latter responding to a pressure condition of predetermined magnitude to open a cut-out switch 34 contained in the electric control circuit which is a salient part of the present invention. The structure thus far described is shown in detail in my afore-identified pending application.

Within the control circuit which is a 3-wire 220 v. circuit, there is also contained the motor 28, a magnetic starter 35 therefor, the three solenoids 25, 17 and 30, relays 36 and 37, a timer 38, and manually operated switches 40 through 45. Switch 40 is a foot-operated switch occupying a position upon the floor to the intermediate front of the cabinet. Switches 41 and 42 are 2 - position two-pole switches operating as respects the former to manually activate the dasher and as respects the latter to establish operation of the freezing system. Switches 43 and 45 are single pole 2-position switches serving when closed to introduce an automatic temperature control and to by-pass the timer 38, respectively. Switch 44 is a 3-position single pole switch movable from an inactive position into either of two operating positions establishing automatic control of the mix feed.

The timer 38 is preferably the electronic type, and in this regard timer "CR-7504-A142G2," manufactured by General Electric, Schenectady, New York, has given excellent results. This timer is provided with two power leads 85, 86 for its operation and it is activated by the foot-switch 40 connected to the timer by leads 87, 88. The timer makes and breaks connection between two leads 67 and 68 in the freezer's control circuit. As shown schematically in Fig. 2, the scale of the timer's timing potentiometer which is normally calibrated in seconds has been changed to a price scale 90 having five cent graduations spaced such that the timer will keep the related control circuit closed the amount of time necessary for the machine to dispense the size of serving indicated by the setting of the knob 91, the latter preferably being a locking type. The timer unit may be mounted on the back side of the freezer's front wall with the knob and price scale positioned on the front side thereof as shown in Fig. 1.

It is thought that the wiring hook-up can be most clearly followed by tracing the several operations to which the present machine admits. Let it be assumed that the freezing cylinder is empty. The operator fills the supply tank with the mix and initially charges the cylinder therefrom by unseating the stopper 14, either by manually lifting the exposed end 15 thereof or by moving switch 44 to its "manual" position. It now becomes desirable to establish a comparatively rapid freeze in order to quickly bring the mix to a serving condition and this is accomplished by closing the manual freezing switch 42. An electric circuit is responsively established from hot line 46, passing through the switch from lead line 47 to a lead line 48 and thence from a lead line 50 to the activating coil 51 of the relay 36, returning by lead line 52 to the neutral 53. The energized coil changes the contact of the relay 36 and completes a circuit from hot lines 46 and 54 through the activating coil 55 of the magnetic starter 35, the current passing through leads 56, 57, 58, 59 and 60. The responsive closing of the magnetic switches 61 and 62 closes a 220 v. circuit from hot lines 46 and 54 through the motor 28 and both the compressor and the dasher then operate. A second lead line 63 returning from the switch 42 to the neutral 53 coincidently energizes a warning light 64.

After this quick freezing has progressed for the comparatively short time interval necessary to bring the custard within the freezing cylinder to a suitable condition for serving, the operator opens switch 42 and closes the push-button switch 43 to introduce the automatic temperature control. Such temperature control finds thermal connection with the freezing cylinder by a gas-filled pipe. The operator, for normal operation, also at this time moves switch 44 to "automatic" position. As the thermally responsive switch of the temperature control cuts in and out, it closes and opens a circuit by lead lines 65, 66, 50, and 52 through the activating coil 51 of the relay 36 to automatically control the energizing of the motor according as the condition of the frozen custard requires.

When a call arises for a serving of frozen custard, the operator turns the portion control dial 91 to the size of serving desired and steps upon the foot switch 40 causing circuits to be simultaneously closed through the timer 38 and the mix feed and serving gate solenoids 12 and 25, common lead lines 67, 68, and 70 acting with connecting leads 71 and 72 to complete a circuit through the serving gate solenoid and via the timer and acting with connecting leads 73, 74, 75 and the mix feed switch 44 to complete a circuit through the mix feed solenoid. Also closed coincidently with the closing of the circuit to the serving gate solenoid is another circuit passing through the activating coil 76 of the relay 37, this circuit drawing current by lead line 68 from hot wire 46 and returning by a lead line 77 to the neutral 53. The energized coil changes the contact of the concerned relay and closes a circuit through lead lines 78, 80, and 52 to the activating coil 51 of the relay 36, and it thus follows that the motor 28, irrespective of the temperature condition obtaining within the freezing cylinder, is caused to be energized automatically in response to each operation of the foot switch 40. This is an essential action in order that the dasher will turn and act by its spirally developed blades to push the frozen custard forwardly within the freezing cylinder toward the delivery spout as the solenoid 25 opens the serving gate. As the custard is discharged into receiving cups held below the spout, the simultaneous opening of the stopper 14 causes replenishing mix to enter the freezing cylinder through the related feed pipe. It is significant that switch 40 is a foot switch, leaving both hands free to hold the receiving cups. When the time has passed for the delivery of the serving for which the portion control dial has been set, the timer automatically breaks the circuit between the leads 67 and 68 causing the coils of the serving gate and mix feed solenoids to be de-energized. As a result the stopper 14 and serving gate 20 automatically return to their closed positions. If it is desired to dispense a portion other than one indicated on the portion control dial, the operator can manually close the switch 45 and by-pass the timer.

Toward the close of a business day it perforce becomes desirable to dispense from the cylinder without replenishing the mix and the operator then moves the mix feed switch 44 to its "off" position. This isolates the mix feed solenoid 17, and operation of the foot switch 40 will now energize the serving gate 25 independently of the solenoid 17.

On occasions it becomes desirable to cause the dasher to turn without at the same time circulating refrigerant through the cylinder, as for example when it is desired to whip added air into the mix, or when the cylinder is being cleared toward the close of a business day or when water is introduced to the cylinder and the dasher employed as an aid to cleaning. To accomplish this end the button switch 43 is opened to inactivate the automatic temperature control and manual dasher switch 41 is closed. This completes two separate circuits, one from hot wire 46 through lead line 81 to the by-pass solenoid 30, returning by a connecting lead 82 to the neutral 53. The second circuit is through the other pole of switch 41, which acts by lead lines 83, 84, 58, 59, and 60 to close a circuit through coil 55 of the magnetic starter and responsively complete the motor circuit. As the motor now operates, it acts to drive the dasher and also turns the crank shaft of the compressor but inasmuch as the solenoid 30 has opened the by-pass line between the low and high pressure refrigerant lines to and from the compressor the suction pull of the compressor simply draws refrigerant from the high to the low side to establish a localized circulation having no effect upon the refrigeration system as a whole.

While I have illustrated and described the now-preferred embodiment of the invention it will be apparent that changes may be resorted to without departing from the spirit of the invention. I accordingly intend that no limitations be implied and that the hereto annexed claims be given a scope fully commensurate with the broadest interpretation to which the employed language fairly admits.

What I claim is:

1. In a portion controlled dispensing freezer, a freezing cylinder adapted to freeze mix supplied thereto, means including a motor-driven dasher for dispensing frozen mix from the freezing cylinder, an automatically resetting electric timer activated by the closing of a self-opening manually closed switch, and control means including an electric control circuit opened and closed by the timer for activating the dispensing means, said timer being arranged and adapted to automatically close the control circuit when activated and to thereafter open the control circuit and thereby inactivate the dispensing means after the passage of a predetermined length of dispensing time, means being provided permitting said dispensing operation including an energizing of the motor which drives the dasher to be performed manually at will.

2. In a portion controlled dispensing freezer, a freezing cylinder adapted to freeze mix supplied thereto, means including a motor-driven dasher for dispensing frozen mix from the freezing cylinder, an electric timer having a manually variable timing cycle, an electric circuit for activating the dispensing means and the timer simultaneously, said timer being arranged and adapted to automatically inactivate the dispensing means after the passage of a length of dispensing time corresponding to the setting of the timer, means being provided permitting said dispensing operation including an energiizng of the motor which drives the dasher to be performed manually at will.

3. In a portion controlled dispensing freezer, a freezing cylinder adapted to freeze mix supplied thereto, means including a motor-driven dasher for dispensing frozen mix from the freezing cylinder, an automatically resetting electric timer activated by the closing of a self-opening manually closed switch, control means including an electric control circuit opened and closed by the timer for activating the dispensing means, said timer being arranged and adapted to automatically close the control circuit when activated and to thereafter open the control circuit and thereby inactivate the dispensing means after the passage of a predetermined length of dispensing time, and electrically controlled filling means operated by the said control means for automatically supplying the same amount of unfrozen mix to the freezing cylinder as is being dispensed in the frozen state while the dispensing means is active, means being provided permitting said dispensing operation including an energizing of the motor which drives the dasher to be performed manually at will.

4. In a portion controlled dispensing freezer, a freezing cylinder adapted to freeze mix supplied thereto, means including a motor-driven dasher for dispensing frozen mix from the freezing cylinder, an automatically resetting variable timer having a portion control knob whereby the timing cycle of the timer may be varied at will in response to a turning of the knob to predetermined settings, manually controlled means for activating the dispensing means and the timer simultaneously, said timer being arranged and adapted to automatically inactivate the dispensing means after the passage of a length of dispensing time corresponding to the setting of the portion control knob, means being provided permitting said dispensing operation including an energizing of the motor which drives the dasher to be performed manually at will.

5. The structure of claim 4 in which the settings of the portion control knob are indicated by a scale having money graduations.

References Cited in the file of this patent

UNITED STATES PATENTS

| | | |
|---|---|---|
| 2,446,156 | Kolz | July 27, 1948 |
| 2,507,255 | Kaufman | May 9, 1950 |
| 2,559,032 | Tacchella | July 3, 1951 |
| 2,580,256 | Tacchella | Dec. 25, 1951 |
| 2,619,117 | Stranak | Nov. 25, 1952 |
| 2,643,026 | Craig | June 23, 1953 |
| 2,667,990 | Mojonnier | Feb. 2, 1954 |
| 2,687,019 | Swenson | Aug. 24, 1954 |